US012039869B2

(12) United States Patent
Golya et al.

(10) Patent No.: US 12,039,869 B2
(45) Date of Patent: Jul. 16, 2024

(54) DRIVER ASSISTANCE SYSTEM INCLUDING PEDESTRIAN PROTECTION FUNCTION

(71) Applicant: Robert Bosch GmbH, Stuttgart (DE)

(72) Inventors: Peter Golya, Budapest (HU); Jose Domingo Esparza Garcia, Stuttgart (DE); Max Neuner, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 112 days.

(21) Appl. No.: 18/053,920

(22) Filed: Nov. 9, 2022

(65) Prior Publication Data

US 2023/0154335 A1 May 18, 2023

(30) Foreign Application Priority Data

Nov. 17, 2021 (DE) ..................... 10 2021 212 904.8

(51) Int. Cl.

*G08G 1/16* (2006.01)
*G08G 1/01* (2006.01)
*G08G 1/095* (2006.01)

(52) U.S. Cl.

CPC ........... *G08G 1/166* (2013.01); *G08G 1/0116* (2013.01); *G08G 1/095* (2013.01); *G08G 1/164* (2013.01)

(58) Field of Classification Search

CPC ...... G08G 1/166; G08G 1/0116; G08G 1/095; G08G 1/164

See application file for complete search history.

(56) References Cited

U.S. PATENT DOCUMENTS

2011/0133917 A1* 6/2011 Zeng ........................ G06T 7/246 340/436
2015/0025787 A1* 1/2015 Lehner ................... B60Q 5/006 701/301
2018/0276986 A1* 9/2018 Delp .................... B60Q 1/5035
2019/0139414 A1* 5/2019 Morimura ........ G08G 1/096716
2022/0105963 A1* 4/2022 Costa ..................... G06V 20/58

* cited by examiner

*Primary Examiner* — Sisay Yacob

(74) *Attorney, Agent, or Firm* — Norton Rose Fulbright US LLP; Gerard A. Messina

(57) ABSTRACT

A driver assistance system for motor vehicles. The system includes a sensor device for detecting the traffic surroundings, a detection module for detecting potential pedestrians based on the data of the sensor device, a plausibility check module for assessing, based on predefined criteria, the probability that a detected potential pedestrian is a real pedestrian, and a warning module for triggering countermeasures in the case of an impending collision with the real pedestrian. The plausibility check module is configured to recognize, based on the data of the sensor device, pedestrian-related traffic infrastructure devices, and to carry out the plausibility check, taking a spatial relationship between the potential pedestrian and the traffic infrastructure device into consideration.

6 Claims, 3 Drawing Sheets

DRIVER ASSISTANCE SYSTEM INCLUDING PEDESTRIAN PROTECTION FUNCTION

CROSS REFERENCE

The present application claims the benefit under 35 U.S.C. § 119 of German Patent Application No. DE 10 2021 212 904.8 filed on Nov. 17, 2021, which is expressly incorporated herein by reference in its entirety.

FIELD

The present invention relates to a driver assistance system for motor vehicles, including a sensor device for detecting the traffic surroundings, a detection module for detecting potential pedestrians based on the data of the sensor device, a plausibility check module for assessing, based on predefined criteria, the probability that a detected potential pedestrian is a real pedestrian, and a warning module for triggering counter-measures in the case of an impending collision with the real pedestrian.

BACKGROUND INFORMATION

Driver assistance systems of this type are described in the related art. Typically, the warning about impending collisions with pedestrians is only one of multiple assistance functions of such an assistance system. Other functions are, for example, cruise control, adjusting the distance from preceding vehicles, lane-keeping assistance functions and the like. The driver assistance system usually also includes a more comprehensive collision warning function, which also warns about collisions with stationary obstacles or other vehicles. However, within the scope of such a warning function, pedestrians require a special treatment since they are less protected than other road users, and since other rules apply to the prediction of the pedestrians' proper motion than, for example, to the prediction of the motion of other vehicles.

The sensor device of the driver assistance system in general includes at least one radar sensor as well as a video system for monitoring the area ahead of the host vehicle. The detection module evaluates the data of the radar sensor as well as the image data of the video system and detects potential obstacles on the roadway and at the roadside, which cannot be ruled out as pedestrians. In the plausibility check module, the hypothesis that the detected object is a pedestrian is then checked in greater detail based on a number of criteria. Examples of such criteria are, for example, the extension of the radar echo in azimuth and in elevation, the shape and size of the contour of the object recorded by the video system, as well as the velocity of the object's proper motion. When the probability that the object is a real pedestrian, as ascertained based on these criteria, exceeds a certain threshold value, the warning module is activated, which then predicts the presumable proper motion of the recognized pedestrian based on certain rules and, taking the current and/or presumable motion of the host vehicle into consideration, calculates a collision probability as well as a "time to collision" (TtC). When the collision probability exceeds a certain threshold value, a signal for triggering measures is output, with the aid of which the collision is to be averted. The range of these measures covers everything from the simple output of an acoustic warning signal to the driver to the automatic triggering of an emergency brake application and/or the initiation of an evasive maneuver by intervention in the steering system of the vehicle. The type and the extent of the counter-measures to be initiated are primarily determined by the TtC.

A turning process of the vehicle is generally a particularly hazardous situation for pedestrians. Since both the radar sensor and the video system only have a limited field of view, pedestrians, who, with respect to the turning process, must be treated as relevant potential obstacles, often only reach the detection range of the sensor device when the turning process has already started, and the host vehicle has changed the driving direction. Only very little time is still available then for the detection and plausibility check of the pedestrian. To nonetheless be able to activate the warning module in time, the plausibility check module must arrive at a decision very quickly. This limits the number and complexity of the criteria which may be checked during the plausibility check. With decreasing complexity of the plausibility check algorithm, however, the relative frequency of false-positive or false-negative assessments necessarily increases. In the case of a false-negative assessment, the potential pedestrian is not recognized as a real pedestrian, and the necessary collision warning is dispensed with. In the case of a false-positive assessment, the system erroneously considers an actually irrelevant object to be a pedestrian, and unnecessarily triggers counter-measures for averting the collision. This not only results in an impairment of the comfort due to frequent unnecessary warning signals, but may also result in an increased risk of accidents, such as during the triggering of unnecessary emergency brake maneuvers which are thus not predictable for other road users.

SUMMARY

It is an object of the present invention to provide a driver assistance system including a pedestrian protection function, in which pedestrians may be recognized more rapidly and/or more reliably.

According to the present invention, this object may be achieved in that the plausibility check module is configured to recognize, based on the data of the sensor device, pedestrian-related traffic infrastructure devices and to carry out the plausibility check, taking a spatial relationship between the potential pedestrian and the traffic infrastructure device into consideration.

Examples of pedestrian-related traffic infrastructure devices are roadway markings, such as crosswalks and the like, however, in particular, also roadway-independent traffic infrastructure devices, such as warning signs indicating an increased pedestrian traffic volume, as well as traffic lights installed specifically for pedestrian traffic, in particular, pedestrian lights and yellow warning flashers, with the aid of which the attention of the motor vehicle driver may be drawn to the pedestrian traffic. When the plausibility check module recognizes such infrastructure devices, it is possible to draw conclusions from the locations of these infrastructure devices as to what zones on or next to the roadway an increased number of pedestrians is to be expected. When the detection module locates potential pedestrians in these zones, the probability is increased that they are real pedestrians, and this circumstance is taken into account in that the recognition threshold for real pedestrians is lowered. In this way, the frequency of false-negative assessments may be reduced, without the frequency of false-positive assessments increasing.

Advantageous embodiments and refinements of the present invention are disclosed herein.

In one specific example embodiment of the present invention, the list of the criteria to be checked during the plausibility check may be shortened when the potential pedestrian is situated in a zone for which an increased probability of pedestrians was established. In this way, the recognition of the pedestrian and the triggering of the counter-measures may be expedited.

If the traffic infrastructure devices are traffic lights, in one specific example embodiment of the present invention, the state of the traffic light is also evaluated. Behind this is the consideration that the probability of pedestrians on a pedestrian crossing is greater when the pedestrian light is green, or when the attention is drawn to pedestrians by a yellow flashing light.

A certain hysteresis may be advantageous during the evaluation of the states of the traffic lights. For example, pedestrians are still to be expected for a certain time at a pedestrian crossing after the pedestrian light has switched from green to red.

The recognition of the traffic infrastructure devices does not have to take place simultaneously with the detection of the potential pedestrians. Since the portion of an intersection or a junction which is situated in the detection range of the sensor device becomes increasingly constricted as the host vehicle approaches the intersection or junction, it may be advantageous to search already for pedestrian-related traffic infrastructure devices before the vehicle has reached the intersection or junction, and while the pedestrian lights or other traffic infrastructure devices set up at this intersection are still within the field of view of the sensor device. When, upon further approaching of the intersection, the pedestrian lights then disappear from the field of view of the camera, the zones in which an increased number of pedestrians is to be expected have already been identified, so that the plausibility check threshold may be adapted as soon as a potential pedestrian is detected in this zone, regardless of whether the pedestrian light is still visible at this point in time.

Exemplary embodiments of the present invention are described in greater detail hereafter based on the figures.

DETAILED DESCRIPTION OF EXAMPLE EMBODIMENTS

Figure 1:
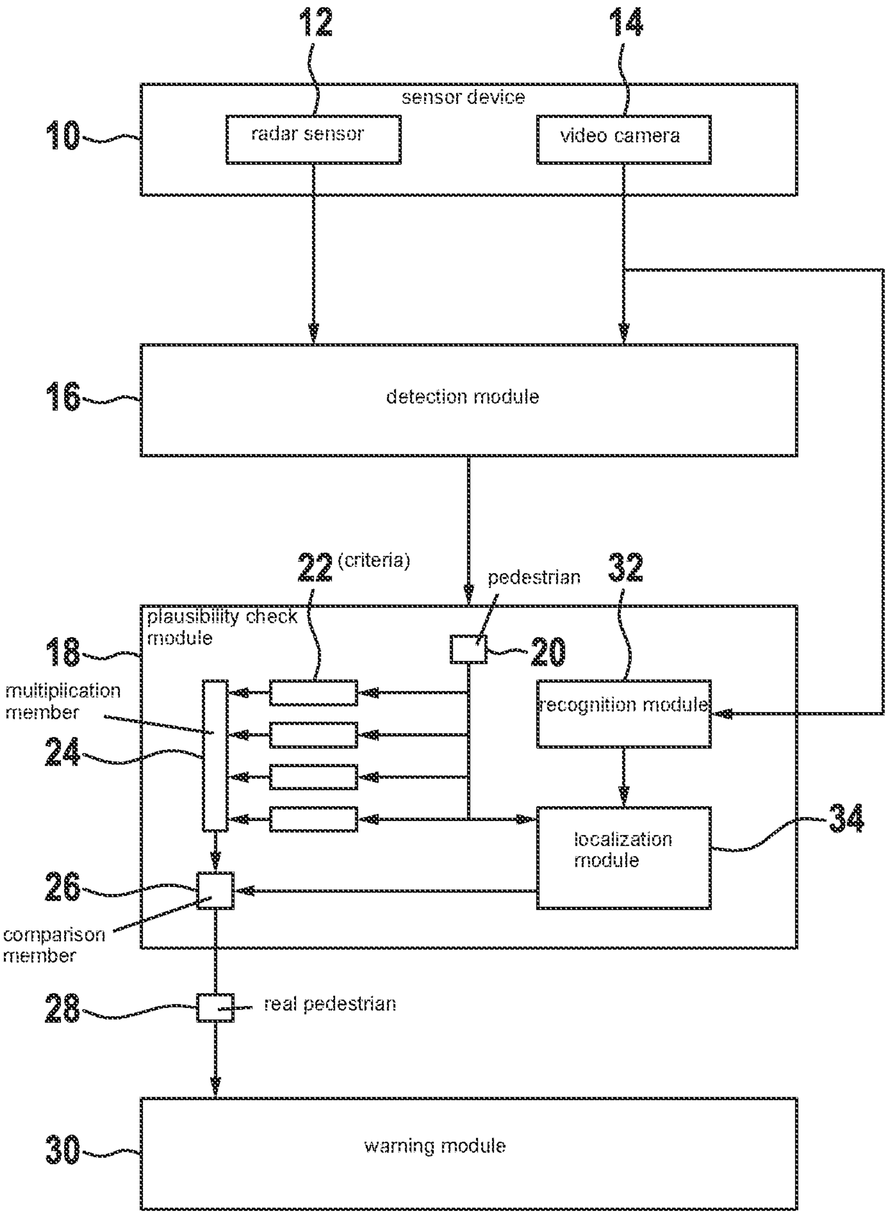
FIG. 1 shows a block diagram of a driver assistance system according to an example embodiment of the present invention.

FIG. 1 shows, in a block diagram, those components of a driver assistance system which are specifically relevant for pedestrians in connection with the collision warning.

A sensor device 10 includes an angle-resolving radar sensor 12 and a video camera 14, which are both directed forwardly in the driving direction of the vehicle and detect both idle and moving objects in the area ahead of the host vehicle. The location data of radar sensor 12 and the image data of video camera 14 are continuously transferred to a detection module 16 which, within the field of view of the radar sensor and of the video camera, searches for objects which could potentially be obstacles. For each located object, radar sensor 12 supplies distance, relative velocity and angle data in azimuth and in elevation. Based on these data, the location of the object and the movement of the object relative to the host vehicle may be determined in detection module 16, and it is also possible, based on the angle data, to roughly estimate the extension of the object. In parallel thereto, a digital processing of the image data supplied by video camera 14 takes place in detection module 16. The image processing also serves to identify objects which could be potential obstacles, and to identify the locations and contours of these objects. The radar and video location data are then fused with one another, so that the data complement one another and supply a more complete picture of the potential obstacle. Within the scope of the digital image processing, infrastructure features such as roadway boundaries, roadway markings and the like are also recognized, so that detection module 16 ultimately generates a continuously updated digital map of the area ahead of the vehicle and of the objects present therein.

Based on the measured relative velocities of the objects and the known velocity of the host vehicle, it is also possible to calculate the absolute velocities of the objects. If these absolute velocities indicate that the objects are other vehicles, e.g., preceding, oncoming or crossing vehicles, the location data are forwarded to modules, which are not shown here, responsible for a distance adjustment and/or for a vehicle collision warning. The data of all other objects are analyzed in greater detail in a plausibility check module 18, with the goal of classifying the objects, for example into the object classes: roadway markings, idle or moving objects on the roadway (with the sub-classifications "traversable" or "not traversable"), idle or moving objects outside the roadway, roadside structures. Each object classified in this way which was not unambiguously recognized as a roadway marking or roadside structure is considered a "potential pedestrian" 20, i.e., an object for which it must be checked, based on a number of criteria 22, as to whether the object is a person, i.e., a pedestrian, or not. Examples of such criteria 22 are, for example, the extension of the radar echo of the object in azimuth and in elevation, the width and height of the object in the video image, recognizability of body parts such as head, torso, extremities in the video image, characteristic movement patterns (e.g., walking or running), the absolute velocity of the object, and the like. Based on each individual of these criteria, a probability value is calculated for the particular object being a pedestrian. The probability values obtained for the individual criteria may be selectively weighted corresponding to the different meaningfulness of the criteria, such as by exponentiation of the probability values using different exponents. The weighted probability values are then multiplied with one another in a multiplication member 24, and the product is compared to a threshold value in a comparison member 26.

In one modified specific embodiment, the probability values are added, and the sum is then standardized to 1.

When the product (or the standardized sum) is above the threshold value, the particular object is classified as a "real pedestrian" 28, and its location data are transferred to a warning module 30.

In the warning module 30, the locations and movements of all recognized pedestrians are tracked, and the future location of the pedestrian is predicted for a sequence of points in time in the future. Furthermore, the presumable driving path of the host vehicle is predicted in warning module 30. Relevant data for the prediction of the driving path are the instantaneous absolute velocity of the host vehicle, the instantaneous steering angle or the yaw velocity, the course of the roadway ascertained by video camera 14 or based on a digital map of a navigation system, destination guidance data of the navigation system, and the state of the turn signal.

If it is possible to rule out, based on the predicted location of the pedestrian and of the predicted driving path of the host vehicle, that a collision will occur between the vehicle and the pedestrian, the tracking of the particular pedestrian is aborted. Otherwise, the tracking is continued, based on updated data, until either a collision may be ruled out or the impending nature of a collision is recognized. In the latter case, the "time to collision" (TtC) is estimated, i.e., the time which will still elapse until the collision occurs, and, depending on urgency, i.e., depending on how short the TtC is, a suitable measure for averting the collision is triggered. If the TtC is still long, only an acoustic warning is output to the driver. In the case of a shorter TtC, it is possible, depending on the functionality of the driver assistance system, for an intervention in the longitudinal control and/or transverse control of the vehicle to take place to avert the collision by a braking maneuver and/or an evasive maneuver.

Plausibility check module 18 includes a recognition module 32, which searches for pedestrian lights and other traffic infrastructure devices in the image data supplied by the video camera which relate to the pedestrian traffic, such as in that they manage pedestrian traffic, such as, for example, crosswalks, or in that they provide warnings about pedestrian traffic, such as warning signs or yellow flashing lights for turning vehicles. When recognition module 32 recognizes such devices, it reports their location to a localization module 34 which, based on the locations of the pedestrian lights and the like, identifies zones on the roadway and/or next to the roadway in which an increased number of pedestrians is to be expected. Furthermore, localization module 34 analyzes the location data of the potential pedestrians and, when a potential pedestrian is situated in a zone identified by the module, the threshold value for this potential pedestrian is reduced in comparison member 26. As a result, an object is already classified as a real pedestrian when the quality of the location data is still low, and the product of the probability values ascertained based on criteria 22 is therefore smaller. For example, it may be achieved in this way that a pedestrian is even classified as real when the potential pedestrian was only detected based on the video data, but this detection is not confirmed by a corresponding radar echo. The reduction of the threshold value also causes a pedestrian to be recognized sooner when his or her outline in the video image is partially hidden by other objects, e.g., a traffic light pole or the like.

Figure 2:
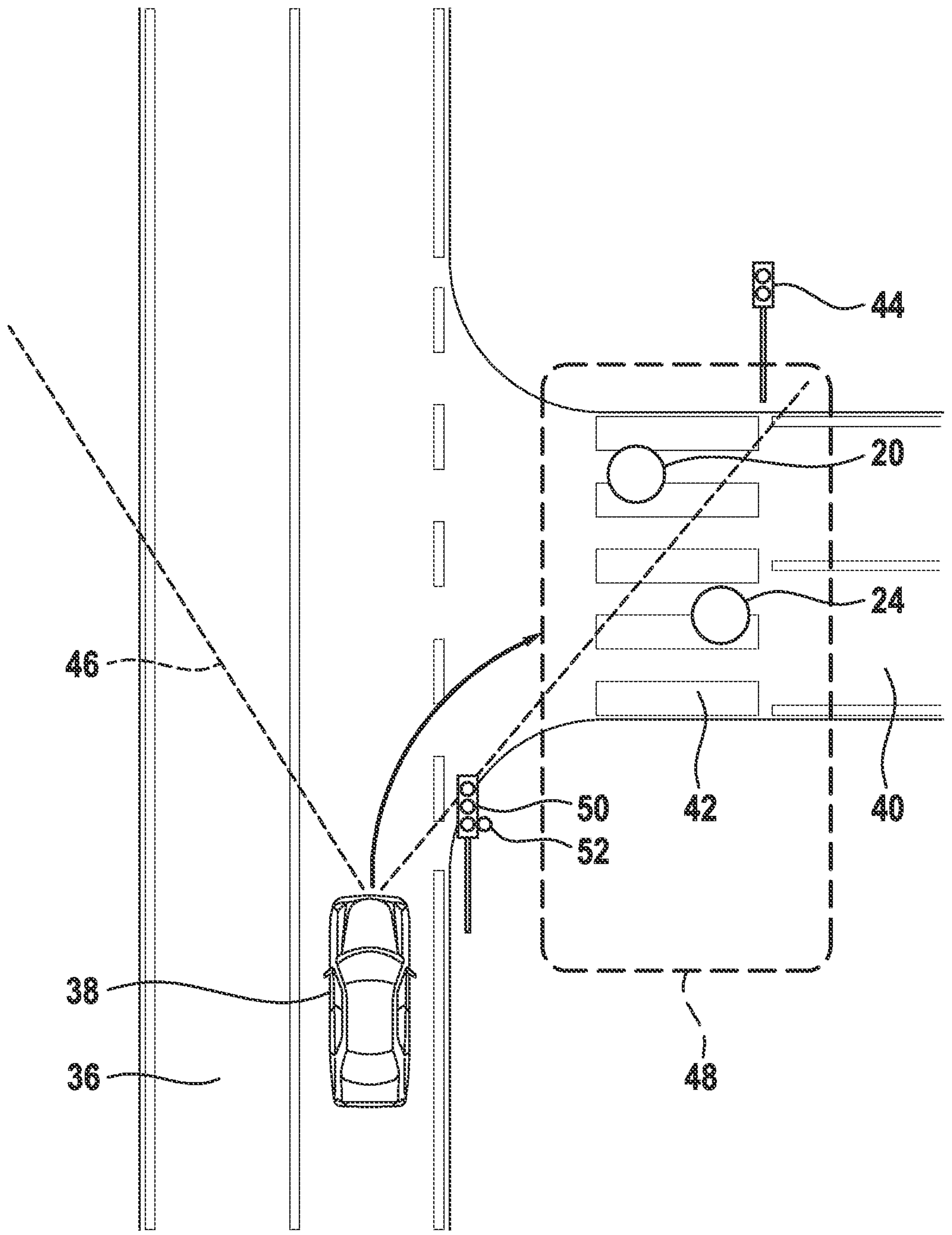
FIG. 2 shows an outline of a traffic situation to illustrate the operating principle of the driver assistance system, according to an example embodiment of the present invention.

FIG. 2 schematically shows a traffic situation in which a vehicle 38 driving on a roadway 36, which is equipped with the driver assistance system described here, approaches a junction of a cross street 40. Based on the destination guidance data of the navigation system or, alternatively, based on the circumstance that the right turn signal of the vehicle is activated, warning module 30 recognizes the intention of the driver to turn right into cross street 40, whereupon the presumable course of the vehicle indicated by an arrow in FIG. 2 is predicted. With respect to this predicted course, potential pedestrians situated and possibly moving to the right, next to the vehicle 38, in a strip outside roadway 36 become relevant.

A pedestrian crossing 42, marked by zebra stripes, is situated at the junction of cross street 40, on which the pedestrian traffic is controlled by pedestrian lights 44 (of which only one is shown). Two (real) pedestrians 20 are presently situated on pedestrian crossing 42, who are in the process of crossing cross street 40. Sensor device 10 of vehicle 38 has a field of vision 46 whose boundaries are indicated by two lines diverging from the vehicle front. In the situation shown here, only one of the two pedestrians 20 is situated within the field of vision 46. The second pedestrian will only enter the field of vision when vehicle 38 has entered cross street 40.

Recognition module 32 of the driver assistance system has already recognized pedestrian light 44 at a point in time at which vehicle 38 was still situated further away from the junction. Thereupon, localization module 34 has identified a zone 48 in which pedestrians may be present with high probability. This zone extends at the location of pedestrian light 44 at a right angle with respect to cross street 40 and thus also includes this cross street, and thus also the pedestrian crossing.

If necessary, recognition module 32 also could have recognized the roadway markings (zebra stripes) of pedestrian crossing 42. However, pedestrian light 44 situated high above the roadway is more easily recognizable from a larger distance than the crosswalk, and thus enables a safer, more reliable and earlier identification of zone 48.

In the example shown, the traffic at the junction is also controlled by a traffic light 50 which includes an additional light signal 52 (yellow flashing light), which is activated when pedestrian light 44 is green to point out the pedestrian traffic to be expected to potential turning vehicles. In the situation shown in FIG. 2, additional light signal 52 is also already no longer situated in the visual range of the sensor device. However, this light signal was already recognized at an earlier point in time and was therefore able to contribute to the identification of zone 48.

Localization module 34 lowers the recognition threshold in comparison member 26 for all potential pedestrians detected within zone 48. For the potential pedestrian 20 already situated in the field of vision 46 of the sensor device, the probability is therefore increased that this pedestrian will be classified as a real pedestrian, in particular, also when the signals received from the sensor device are still highly noisy. When the second potential pedestrian 24 enters the field of vision, initially no movement data will be available yet about this object, so that these movement data cannot contribute yet to an increase in the recognition probability. However, due to the reduced recognition threshold, this pedestrian may also be recognized in time.

Recognition module 32 not only recognizes the contours of pedestrian light 44 and of additional light signal 52, but also their present state (red or green, or yellow flashing or not). The recognition threshold for objects within zone 48 may, for example, be lowered further when, at the moment at which additional light signal 52 has disappeared from the visual range, this additional light signal was also active. The recognition threshold will also be lowered to a greater degree when pedestrian light 44 is green than in the state in which it is red.

As long as pedestrian light 44 is still situated in field of vision 46, however, it is useful to keep the recognition threshold at a low value for a certain time when the system recognizes that the traffic light is switching to red. In this situation, it is to be expected that pedestrians have already stepped onto pedestrian crossing 42 and will still traverse cross street 40.

During the evaluation of the state of pedestrian light 44, further refinements and differentiations are possible. For example, a typical situation is that pedestrians are waiting at the edge of cross street 40 for the pedestrian light to switch to green. Warning module 30 has tracked these pedestrians' proper motions and established that the pedestrians are stationary. In the case of the prediction of the future movement, the result would therefore normally be that the pedestrians will also continue to remain stationary. However, when the system recognizes that the traffic light is switching to green, the pedestrians will step onto the pedestrian crossing and, depending on the side from which they traverse cross street 40, will sooner or later also step into the presumable course of vehicle 38. In the case of such a change of state of pedestrian light 44, the prediction of the pedestrian movement is therefore accordingly modified. In the extreme case, this may go so far that a collision probability is even still assumed when the pedestrians waiting at the pedestrian light have not yet stepped into field of vision 46 (at the right edge).

Figure 3:
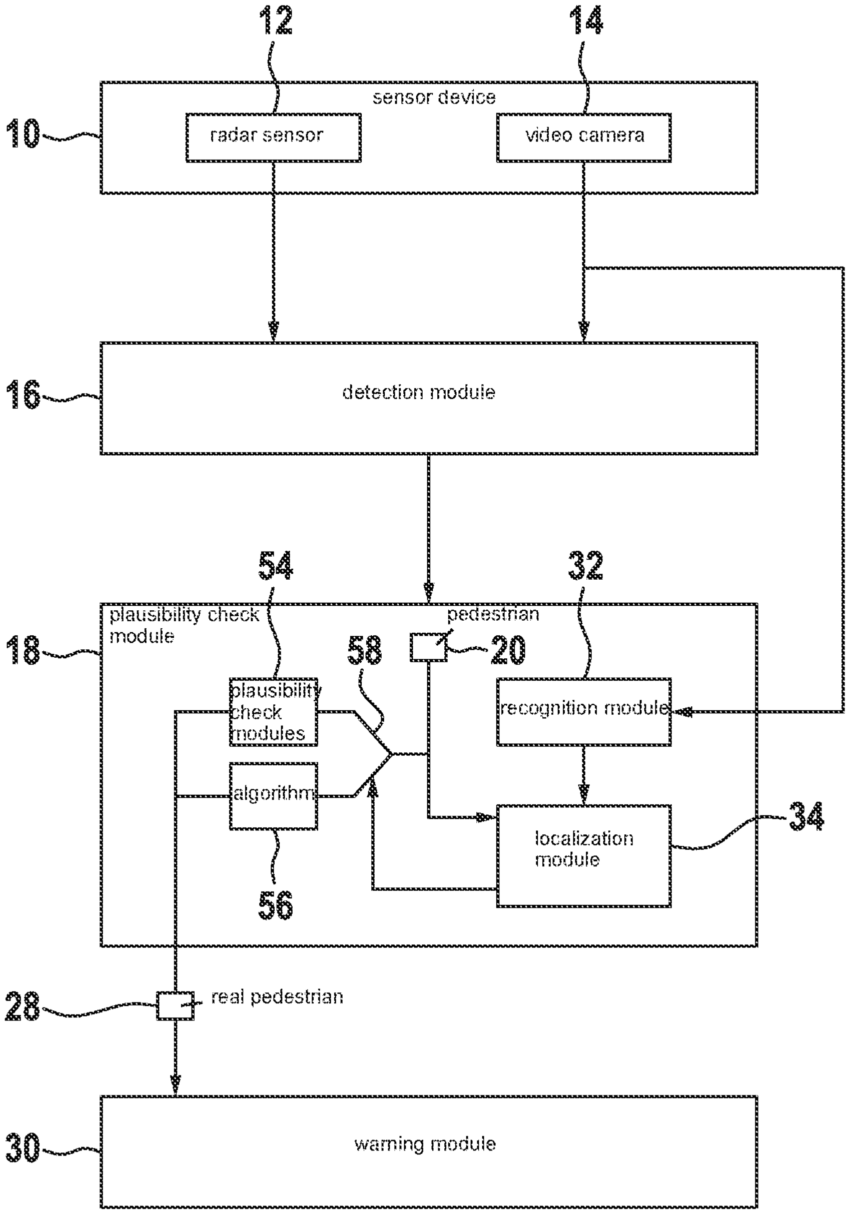
FIG. 3 shows a block diagram of a driver assistance system according to another exemplary embodiment of the present invention.

FIG. 3 shows a block diagram of a modified specific embodiment in which plausibility check module 18 includes two alternative plausibility check algorithms 54 as well as a switch 58 actuated by localization module 34 for switching between the two plausibility check algorithms.

In the case of the plausibility check of a potential pedestrian 20 who is not situated in zone 48, plausibility check algorithm 54 is selected, which places strict requirements on the positive recognition of a real pedestrian in that it checks a large number of independent criteria. This algorithm will therefore have a low frequency for false-positive recognitions, but is relatively computing-intensive, so that the result is only available after a relatively long time.

In a situation in which vehicle 38 is still relatively far away from zone 48, this slow algorithm 54 may also be used for potential pedestrians who are situated within zone 48. If, however, as in FIG. 2, the vehicle is already situated just ahead of zone 48, and potential pedestrians 20 are then detected in this zone, a switch to algorithm 56 takes place, which places less strict requirements on the positive recognition of a real pedestrian, but instead operates more rapidly so that the pedestrian may be recognized more rapidly.

It shall be understood that the two embodiment variants shown in FIGS. 1 and 3 may also be combined with one another.

What is claimed is:

1. A driver assistance system for a motor vehicle, comprising:

a sensor device configured to detect traffic surroundings;

a detection module configured to detect potential pedestrians based on data of the sensor device;

a plausibility check module configured to assess, based on predefined criteria, a probability that a detected potential pedestrian is a real pedestrian; and a warning module configured to trigger counter-measures in a case of an impending collision with the real pedestrian;

wherein the plausibility check module is configured to recognize, based on the data of the sensor device, pedestrian-related traffic infrastructure devices, and to carry out a plausibility check, taking a spatial relationship between the potential pedestrian and the traffic infrastructure device into consideration.

2. The driver assistance system as recited in claim 1, wherein the pedestrian-related traffic infrastructure device include traffic infrastructure devices that are situated above a roadway plane.

3. The driver assistance system as recited in claim 2, wherein the pedestrian-related traffic infrastructure devices situated above the roadway plane include traffic lights.

4. The driver assistance system as recited in claim 3, wherein the plausibility check module is configured to carry out the plausibility check as a function of a state of the traffic lights which they have at a present point in time or had in an immediate past.

5. The driver assistance system as recited in claim 4, wherein the plausibility check module is configured to store a recognized state of a traffic light of the traffic lights when the traffic light, due to a movement of a host vehicle, migrates out of a visual range of the sensor device.

6. The driver assistance system as recited in claim 4, wherein the plausibility check module is configured, based on the recognized pedestrian-related traffic infrastructure devices, to already identify a zone on or next to the roadway, in which an increased probability for an occurrence of pedestrians exists, at a point in time at which the host vehicle has not yet reached the zone.

* * * * *